US009410577B2

(12) United States Patent
Brodbeck et al.

(10) Patent No.: US 9,410,577 B2
(45) Date of Patent: Aug. 9, 2016

(54) BEARING ARRANGEMENT

(71) Applicant: Mahle International GmbH, Stuttgart (DE)

(72) Inventors: Luke Brodbeck, Brighton, MI (US); Jeff Carter, Warwick (GB); Falk Schneider, Korntal-Muenchingen (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 14/103,269

(22) Filed: Dec. 11, 2013

(65) Prior Publication Data
US 2014/0158077 A1 Jun. 12, 2014

(30) Foreign Application Priority Data

Dec. 11, 2012 (DE) .......................... 10 2012 222 752

(51) Int. Cl.
| F01M 1/06 | (2006.01) |
| F16C 33/20 | (2006.01) |
| F01L 1/46 | (2006.01) |
| F01L 1/047 | (2006.01) |
| F01M 9/10 | (2006.01) |
| F16C 33/10 | (2006.01) |
| F01M 9/06 | (2006.01) |
| F16C 17/02 | (2006.01) |

(52) U.S. Cl.
CPC ............... *F16C 33/203* (2013.01); *F01L 1/047* (2013.01); *F01L 1/46* (2013.01); *F01M 9/102* (2013.01); *F16C 33/1045* (2013.01); *F01L 2001/0476* (2013.01); *F01M 9/06* (2013.01); *F16C 17/02* (2013.01); *F16C 33/106* (2013.01); *F16C 2360/18* (2013.01)

(58) Field of Classification Search
CPC .......... F01L 1/46; F01L 1/047; F16C 33/203; F16C 33/1045; F01M 9/102
USPC ............................................... 123/90.6, 90.34
See application file for complete search history.

(56) References Cited

U.S. PATENT DOCUMENTS

| 2,654,441 A | 10/1953 | Orr et al. |
| 3,502,380 A | 3/1970 | Adinoff |
| 3,508,945 A | 4/1970 | Haemer et al. |
| 4,329,887 A | 5/1982 | Kawamoto |
| 4,565,168 A | 1/1986 | Rivere |
| 4,717,268 A | 1/1988 | Orkin |
| 4,775,249 A | 10/1988 | Roemer et al. |

(Continued)

FOREIGN PATENT DOCUMENTS

| DE | 1812600 A1 | 7/1969 |
| DE | 3004365 A1 | 8/1980 |

(Continued)

OTHER PUBLICATIONS

English abstract for DE-3004365.

(Continued)

*Primary Examiner* — Zelalem Eshete
(74) *Attorney, Agent, or Firm* — Fishman Stewart PLLC

(57) ABSTRACT

A bearing arrangement may include at least one sliding bearing having a polymer coating. The bearing arrangement may bear a camshaft, and at least one of the polymer coating is applied to the camshaft, and the polymer coating is arranged in a bearing ring. An oil trough for collecting oil may be provided on at least one of the bearing ring and a cylinder head which receives the bearing ring.

19 Claims, 3 Drawing Sheets

(56) References Cited

U.S. PATENT DOCUMENTS

| | | | | |
|---|---|---|---|---|
| 5,207,512 | A | * 5/1993 | Grant et al. | 384/464 |
| 5,320,795 | A | 6/1994 | Mitchell et al. | |
| 6,209,509 | B1 | * 4/2001 | Kammeraad et al. | 123/196 R |
| 8,033,733 | B2 | 10/2011 | Lang | |
| 8,034,865 | B2 | 10/2011 | Hamel et al. | |
| 2006/0245675 | A1 | * 11/2006 | Lang | 384/95 |

FOREIGN PATENT DOCUMENTS

| | | |
|---|---|---|
| DE | 3230700 A1 | 3/1984 |
| DE | 3241002 A1 | 5/1984 |
| DE | 4117162 A1 | 11/1992 |
| DE | 10322250 A1 | 12/2004 |
| DE | 202006014691 U1 | 12/2006 |
| EP | 1717469 A2 | 11/2006 |
| JP | 2002-4824 | 1/2002 |
| WO | WO-2010/006396 A1 | 1/2010 |

OTHER PUBLICATIONS

English abstract for DE-3241002.
English abstract for DE-4117162.
English abstract for DE-10322250.
German Search Report DE-102012222752.0.
Ha, Youri, et al.; Microstructure and Properties of Rigid Rod-like PolyimideJFlexible Coil-like Poly(amide-imide) Molecular Composite Films, Mar. 12, 2009, vol. 18, No. 1 pp. 14-21.

\* cited by examiner

BEARING ARRANGEMENT

CROSS-REFERENCE TO RELATED APPLICATIONS

This application claims priority to German Patent Application 10 2012 222 752.0 filed Dec. 11, 2012, which is hereby incorporated by reference in their entirety.

TECHNICAL FIELD

The present invention relates to a bearing arrangement, having at least one sliding bearing which has a polymer coating, according to the preamble of claim 1.

BACKGROUND

WO 2010 066 396 A1 discloses a generic bearing arrangement, in particular for bearing a crankshaft, wherein the polymer coating is intended to help facilitate the bearing of the crankshaft and thereby save energy and also to be able to make the bearing arrangement more cost-effective overall.

SUMMARY

The present invention is concerned with the problem of specifying an improved embodiment for a bearing arrangement of the generic type, which is best suited specifically for bearing further engine shafts.

This problem is solved according to the invention by the subject matter of the independent claims. Advantageous embodiments form the subject matter of the dependent claims.

The present invention is based on the general concept of using a plurality of sliding bearings, each having a plastic bearing, that is, in particular a polymer coating, for bearing a camshaft in an internal combustion engine. The polymer coating is alternatively attached directly to the camshaft or else arranged in a bearing ring, wherein an oil trough in the form of an oil collection region for collecting oil lubricating the camshaft is provided on the said bearing ring or on a cylinder head receiving the bearing ring. The sliding bearing of the camshaft by means of the polymer-coated bearing points according to the invention makes it possible in particular to use oil with low viscosity and for example no longer to apply oil directly to the bearing points but only to use oil sprayed there for lubrication. For example, oil supply channels, which were previously present and comparatively complex, can be omitted as a result. In the light of this background, it is possible to use an oil pump of lower power, which is more cost-effective and requires less installation space, which is of particular advantage in particular with regard to the ever-shrinking engine compartments in modern motor vehicles. A further great advantage of such a polymer-mounted camshaft is the use of what are known as stop/start strategies, with which many current motor vehicles are already equipped to be able to save fuel and thus energy. $CO_2$ emissions can also be reduced by reducing the friction and by possibly using a lower-power oil pump, which in turn brings considerable advantages for the environment.

In an advantageous development of the solution according to the invention, the polymer coating is applied directly to the camshaft and also an oil supply channel is arranged in the cylinder head, which channel opens out at a bearing point which is in sliding contact with the polymer coating applied to the camshaft. Although the previously obligatory oil supply channel is present in the cylinder head in this embodiment, the friction of the camshaft can still be significantly reduced compared to previous sliding bearings. Just rolling bearings have a similarly low friction but are considerably more expensive to produce.

In a further advantageous embodiment of the solution according to the invention, the polymer coating is arranged in a bearing ring, which has at least one positioning element, for example in the form of a bead, on its side facing the cylinder head, which positioning element engages in a recess formed in the cylinder head and thereby positions the bearing ring, in particular in the axial direction, relative to the cylinder head. With such an embodiment of the bearing arrangement according to the invention, a simpler and at the same time more precise installation of the camshaft including the bearing arrangements in the cylinder head is possible. Such positioning elements and associated recesses also allow a poka-yoke system to be realised, by means of which incorrect installation of the bearing arrangement or of the camshaft can be completely ruled out. The polymer coating expediently has a structure, in particular a film-forming or oil-conveying structure. Such an oil-conveying or oil-film-forming structure effects constant lubrication of the bearing point, that is, of an intermediate space between the polymer coating and the camshaft or cylinder head. The friction of the camshaft in the bearing arrangement can again be considerably reduced by means of such an oil-film-forming structure, which in turn entails a reduction in $CO_2$ emissions. The structures can for example be formed as grooves or similar depressions.

In a further advantageous embodiment of the solution according to the invention, the polymer coating contains polyimide, acrylate or epoxy resin. Just this list suggests that a large number of plastics are suitable for the polymer coating, that is, for the plastic coating, which plastics only have to have the temperatures occurring in the region of the bearing of the camshaft and a resistance to oil. For example, polyimide is a high-performance plastic, the most important structural feature of which is the imide group. The most important properties of polyimides include for example their temperature resistance and chemical resistance, as a result of which they are particularly suitable for the use of the polymer coating according to the invention in the bearing arrangement. Epoxy resins can also be formed by mixing different polymers in such a manner that a duroplastic of high strength and chemical resistance is achieved, depending on the reaction process and with the addition of suitable hardeners.

In a further advantageous embodiment of the solution according to the invention, the polymer coating contains metallic particles and/or polytetrafluoroethylene (PTFE) in a concentration of 1-15% by volume. With the addition of such particles, for example PTFE particles, the chemical resistance of the polymer coating can be increased further, as in particular PTFE has a high chemical resistance to aggressive chemicals. Furthermore, polytetrafluoroethylene has the great advantage that its static friction is exactly the same as the dynamic friction, so the transition from stationary to moving can take place without jerking, which is of great advantage in particular in motor vehicles with stop/start systems. Of course, it is also conceivable to form the polymer coating entirely from PTFE.

Further important features and advantages of the invention can be found in the subclaims, the drawings and the associated description of the figures using the drawings.

It is self-evident that the above-mentioned features and those still to be explained below can be used not only in the combination given in each case but also in other combinations or alone without departing from the scope of the present invention.

Preferred exemplary embodiments of the invention are shown in the drawings and are explained in more detail in the description below, the same reference symbols referring to the same or similar or functionally equivalent components.

BRIEF DESCRIPTION OF THE DRAWINGS

In the figures.

DETAILED DESCRIPTION

Figure 1:
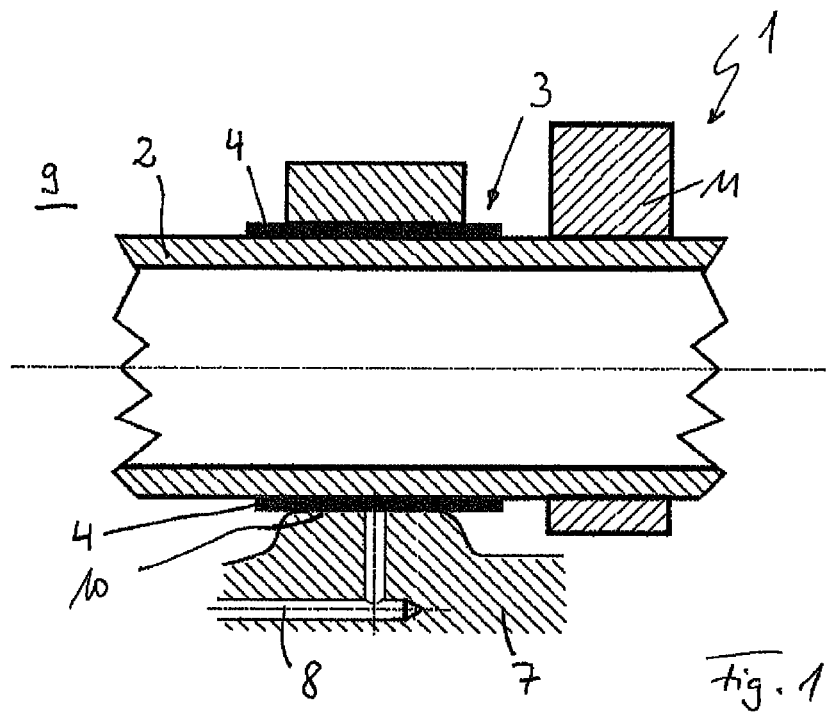
FIG. 1 schematically shows a first possible embodiment of the bearing arrangement according to the invention, in which the polymer coating is applied to the camshaft, FIG. 2 schematically shows an alternative embodiment of the bearing arrangement according to the invention, in which the polymer coating is arranged in a bearing ring, which at the same time has an oil trough, FIG. 3 schematically shows a side view of the bearing ring according to the invention, FIG. 4 schematically shows a further embodiment of the bearing arrangement according to the invention, but with an oil collection trough arranged in the cylinder head, FIG. 5 schematically shows a further embodiment of the bearing arrangement according to the invention with a bearing ring and an oil collection trough in the cylinder head, wherein the diameter of the camshaft is enlarged in the region of the bearing arrangement.
Figure 2:
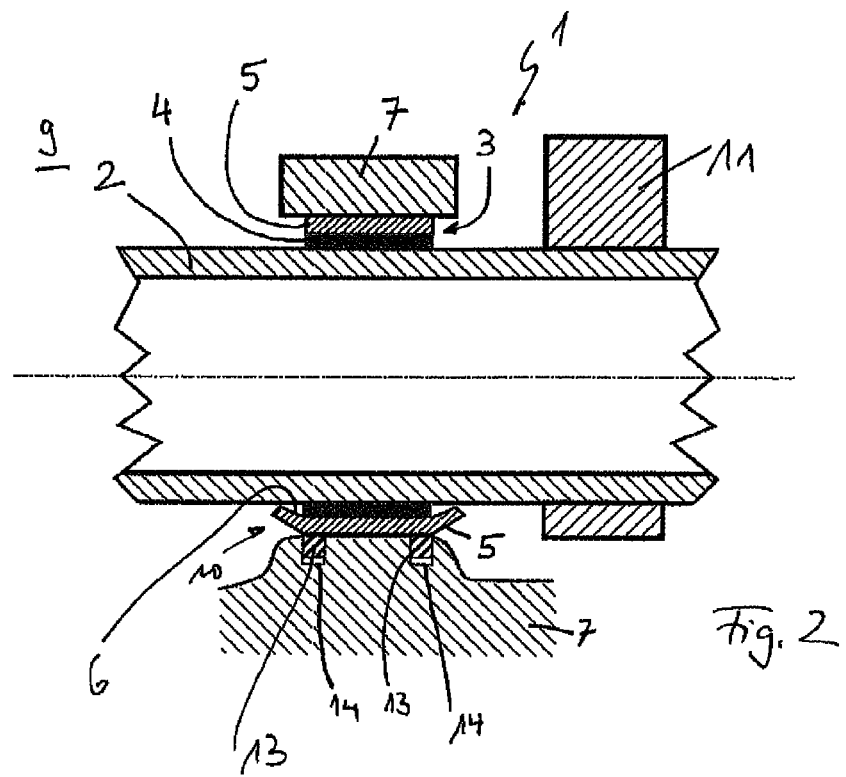
Figure 3:
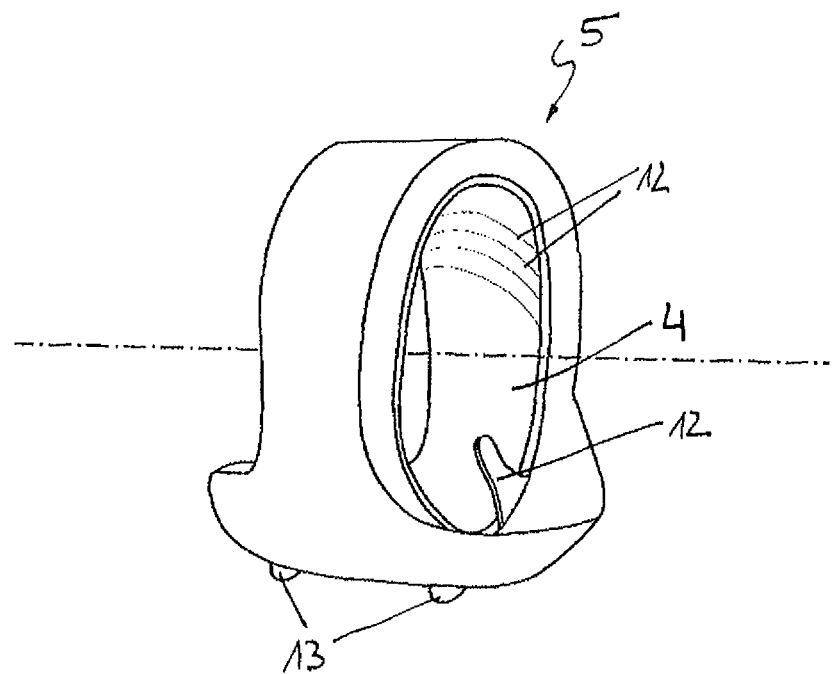
Figure 4:
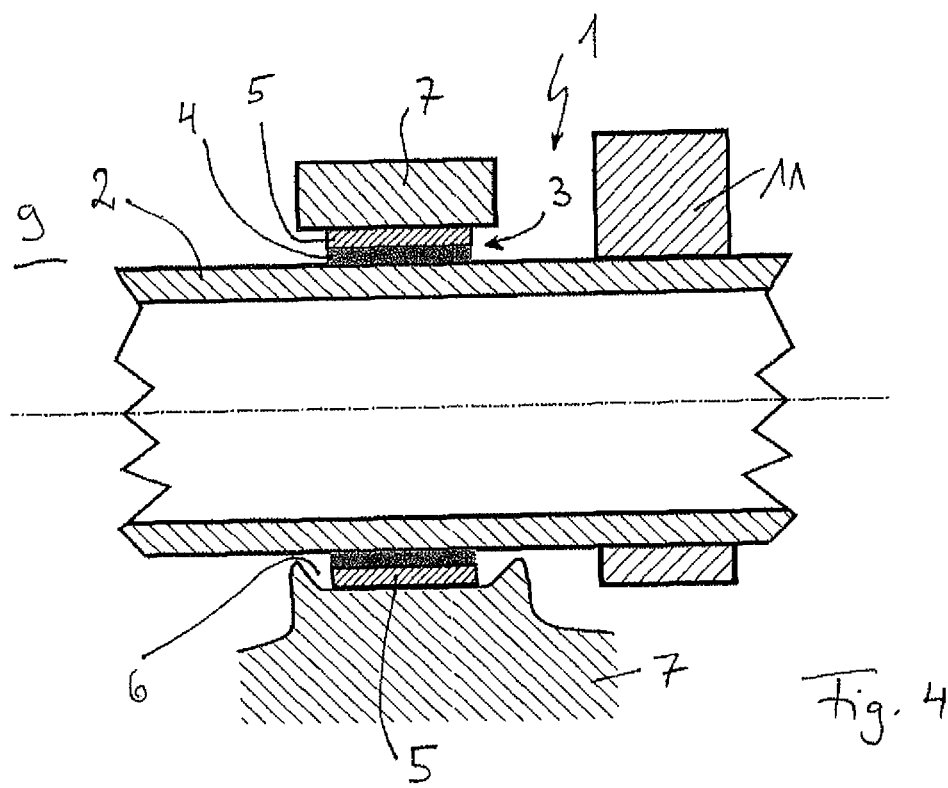

According to FIGS. 1, 2, 4 and 5, a bearing arrangement 1 according to the invention of a camshaft 2 has at least one sliding bearing 3, which has a polymer coating 4. According to the invention, the polymer coating 4 is applied directly to the camshaft 2, as is shown by way of example in FIG. 1, or alternatively in a bearing ring 5, as is shown in FIGS. 2 to 4, an oil trough 6 for collecting oil being provided on the bearing ring. In the embodiment of the bearing arrangement 1 according to the invention shown in FIG. 4, the oil trough 6 can also be arranged on a cylinder head 7. The oil trough 6 effects a collection of sprayed oil, so that when such an oil trough 6 is present, a separate and comparatively complex oil supply, for example by means of an oil supply channel 8 (cf. FIG. 1) can generally be omitted.

The friction of the camshaft 2 can be considerably reduced with the sliding bearing according to the invention, owing to the polymer coating 4, as a result of which an internal combustion engine 9 equipped therewith consumes less fuel and emits less $CO_2$. In addition, oil of a lower viscosity can be used in the bearing arrangement 1 according to the invention and, as mentioned above, a separate oil supply can be omitted entirely, as a result of which an oil pump can be configured to have a lower power. In turn, energy can be saved and the $CO_2$ emissions can be reduced owing to the lower oil pressure and the lower rating of the oil pump. Depending on the plastic used for the polymer coating 4, the transition from the stationary to the rotating camshaft 2 can also be made easier, which is of great advantage in particular in modern motor vehicles with what are known as stop/start systems.

It can be seen in FIG. 1 that an oil supply channel 8 is arranged in the cylinder head 7, which channel opens out at a bearing point 10, this bearing point 10 being in sliding contact with the polymer coating 4 applied to the camshaft 2. In the embodiment shown in FIG. 1, direct lubrication of the bearing point 10 and thus of the bearing arrangement 1 is still provided.

In the alternatives shown in FIGS. 2 to 5, the polymer coating 4 is arranged on the bearing ring 5, it being possible for the bearing ring 5 generally to be formed as a sheet metal part. In this case the camshaft 2 could be inserted into a closed bearing tunnel with pre-mounted bearing rings 5, as long as a bearing outer diameter is greater than a diameter of a cam 11. The oil sprayed onto the camshaft 2 is collected by the oil trough 6 (cf. FIGS. 2 and 3) and can then be used constantly for renewed lubrication of the sliding bearing 3. Alternatively to the formation of the oil trough 6 in the bearing ring 5, it can also be formed directly in the cylinder head 7, as is shown in FIG. 4, it only being possible in this case for a divided bearing frame to be used.

Figure 5:
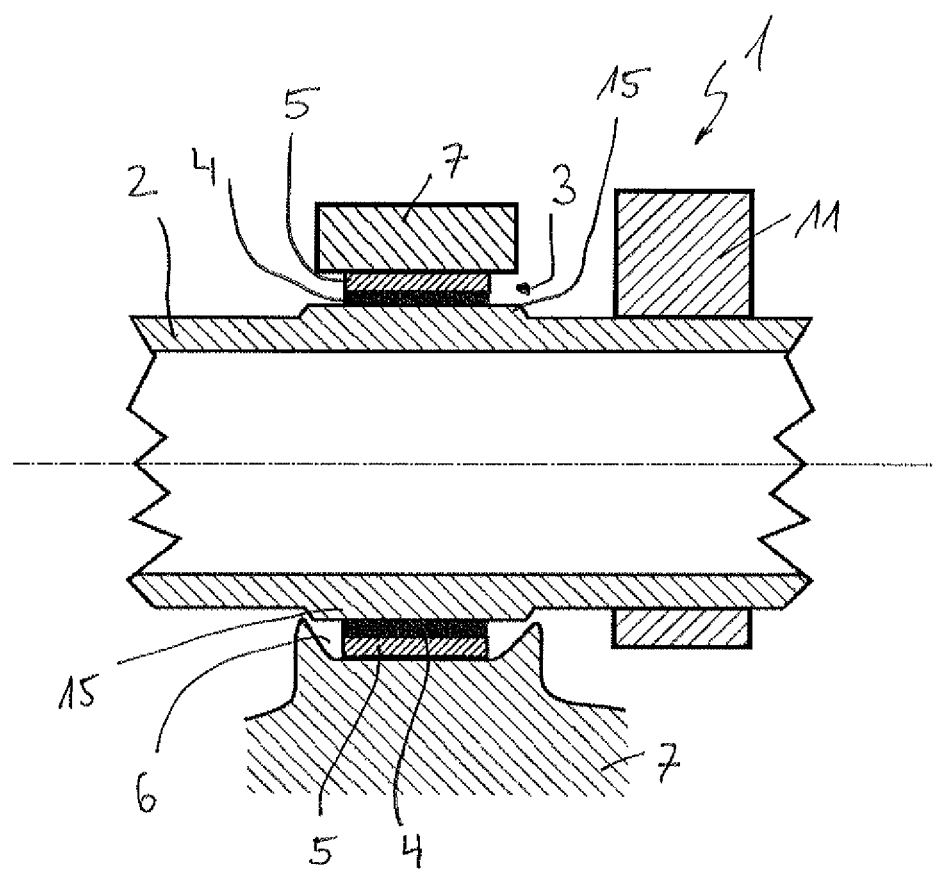

FIG. 5 shows an alternative in which the camshaft 2 has an enlarged outer diameter in the region of the sliding bearing 3 and thus creates a raised bearing region 15. The direct running region of the sliding bearing is thereby brought closer into the region of the oil trough 6, which effects a particularly advantageous supply with oil. In this variant, only a divided bearing frame can be used. For improved mounting of the cams 11 on the camshaft 2, it is of course also conceivable to make the join seats of the cams 11 on the cam shaft side raised as well, so that the cams have at least the diameter of the bearing points.

It can be seen in FIG. 3 that the polymer coating 4 has a structure 12, in particular in the form of grooves or furrows, as a result of which in particular a continuous supply via the polymer coating 4 and oil film formation can be supported. The friction of the camshaft 2 can again be considerably reduced by the buildup of a hydrodynamic lubricating film by means of the structure 12.

It can be seen in the bearing ring 5 of FIGS. 2 and 3 that it has at least one positioning element 13 on its side facing the cylinder head 7, which element engages in a recess 14 formed in the cylinder head 7 and thereby positions the bearing ring 5 relative to the cylinder head 7. The positioning elements 13 can for example be in the form of beads formed integrally with the bearing ring 5. The positioning elements 13 in particular effect fixing in the axial direction relative to the cylinder head 7.

A wide variety of polymers, for example polyimide, acrylate, polytetrafluoroethylene or epoxy resin, can be used for the polymer coating 4. Polyimides, for example, have a high thermal and chemical resistance. The chemical resistance is of great significance in particular in connection with alternative fuels such as the addition of alcohol or impurities owing to long oil change intervals. Polytetrafluoroethylene (PTFE) has similar properties and furthermore has the great advantage that the static friction is equal to the dynamic friction, as a result of which the starting of the camshaft 2 is made easier. The polymer coating 4 can furthermore have metallic particles and/or PTFE particles in a concentration of 1-15% by volume. It was found in experiments that the addition of such additional particles, for example aluminium flakes or ceramic particles, improves wear resistance. Furthermore, improved heat dissipation from the bearing zone could be achieved with such particles.

In general, a bearing arrangement 1 which is not only inexpensive and simple to produce, but also a bearing arrangement 1 with considerably improved friction compared to previous sliding bearings, can be created with the bearing arrangement 1 according to the invention. Only rolling bearings have similarly good properties, but are considerably more expensive to produce.

The invention claimed is:

1. A bearing arrangement, comprising at least one sliding bearing having a polymer coating, wherein the bearing arrangement bears a camshaft, and at least one of:

the polymer coating is applied to the camshaft, and
the polymer coating is arranged in a bearing ring, wherein an oil trough for collecting oil is provided on at least one of the bearing ring and a cylinder head which receives the bearing ring;
wherein at least a portion of the polymer coating has an oil-film-forming structure in the form of depressions; and
wherein the polymer coating includes metallic particles.

2. The bearing arrangement according to claim 1, wherein an oil supply channel is arranged in the cylinder head, the channel opening out at a bearing point, wherein the bearing point is in sliding contact with the polymer coating applied to the camshaft.

3. The bearing arrangement according to claim 1, wherein the bearing ring has at least one positioning element on its side facing the cylinder head, the at least one positioning element engages in a recess formed in the cylinder head thereby positioning the bearing ring relative to the cylinder head.

4. The bearing arrangement according to claim 1, wherein the bearing ring is formed as a sheet metal part.

5. The bearing arrangement according to claim 1, wherein the polymer coating has at least one of a film-forming and oil-conveying structure.

6. The bearing arrangement according to claim 1, wherein the polymer coating contains at least one of polyimide, acrylate, polytetrafluoroethylene (PTFE) and epoxy resin.

7. The bearing arrangement according to claim 6, wherein the polymer coating contains at least one of metallic particles and polytetrafluoroethylene particles in a concentration of 1-15% by volume.

8. The bearing arrangement according to claim 1, wherein the camshaft has a raised bearing region in which the at least one sliding bearing with the polymer coating runs.

9. The bearing arrangement according to claim 8, wherein the raised bearing region comprises an enlarged diameter of the camshaft.

10. The bearing arrangement according to claim 3, wherein at least one of the positioning elements includes beads formed integrally with the bearing ring.

11. The bearing arrangement according to claim 3, wherein the bearing ring is formed as a sheet metal part.

12. The bearing arrangement according to claim 1, wherein the polymer coating contains at least one of metallic particles and polytetrafluoroethylene particles in a concentration of 1-15% by volume.

13. The bearing arrangement according to claim 1, wherein the polymer coating includes at least one of aluminum flakes and ceramic particles.

14. An internal combustion engine, comprising:
a camshaft;
a bearing arrangement bearing the camshaft, the bearing arrangement including at least one sliding bearing having a polymer coating, wherein at least one of:
the polymer coating is applied to the camshaft, and
the polymer coating is arranged in a bearing ring, wherein an oil trough for collecting oil is provided on at least one of the bearing ring and a cylinder head which receives the bearing ring;
wherein at least a portion of the polymer coating has an oil-film-forming structure in the form of depressions including at least one of grooves and furrows; and
wherein the polymer coating includes metallic particles.

15. The internal combustion engine according to claim 14, wherein the bearing arrangement includes an oil supply channel arranged in the cylinder head, the channel opening out at a bearing point.

16. The internal combustion engine according to claim 15, wherein the bearing point is in sliding contact with the polymer coating applied to the camshaft.

17. The internal combustion engine according to claim 14, wherein the bearing ring includes at least one positioning element on its side facing the cylinder head, wherein the at least one positioning element engages in a recess formed in the cylinder head thereby positioning the bearing ring in the axial direction relative to the cylinder head.

18. The internal combustion engine according to claim 14, wherein the camshaft has a raised bearing region in which the at least one sliding bearing with the polymer coating runs.

19. A bearing arrangement, comprising:
at least one sliding bearing including a bearing ring and a polymer coating arranged in the bearing ring, the bearing arrangement bearing a camshaft; and
a cylinder head that receives the bearing ring, an oil trough for collecting oil being provided in the cylinder head;
wherein at least a portion of the polymer coating has an oil-film-forming structure in the form of at least one of grooves and furrows.

* * * * *